United States Patent Office 2,911,005
Patented Nov. 3, 1959

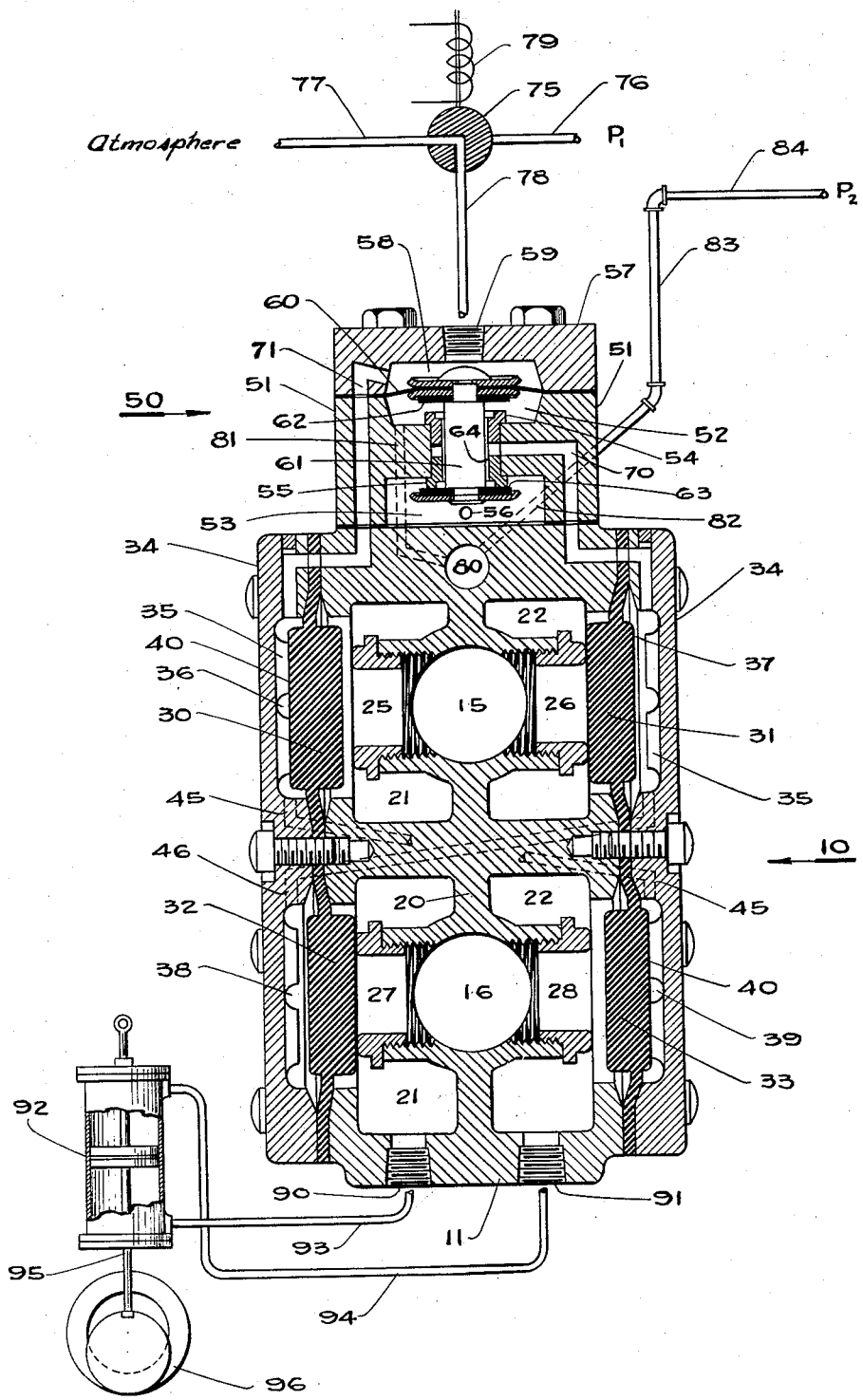

2,911,005

CONTROL FOR FOUR-WAY FLUID SWITCH

Samuel L. Adelson, Tucson, Ariz., assignor to Infilco Incorporated, Tucson, Ariz., a corporation of Delaware Application February 6, 1956, Serial No. 563,701

5 Claims. (Cl. 137—622)

This invention relates to pneumatically controlled four-way switch valves that may be used singly or in banks of any number with common supply and waste connections. Such valves are widely used in combination with others of similar construction for controlling the operation of a plurality of fluid cylinders connected with gate valves or other devices it is desired to control.

It is an object of this invention to provide an improved multiple port switch device of the flexible diaphragm type.

A further object of the invention is to provide a simple device of this general type that may be operated by improved means from a remote location.

Another object of the invention is to provide a device of the class described which may be constructed at a low cost, and in which the operation of the valve diaphragms is controlled by a single three-way pilot valve.

A further object of the invention is to provide a device which may be operated with little physical force so that hand or solenoid operation may be used.

Other objects of the invention will become apparent from the specification and claims which follow.

The flow of fluid in the main passages of multiple port switch devices presently in use is quite often controlled by flexible diaphragms operated by means of a pilot valve. The pilot valve may be, and in many cases is, operated from a remote location. In such a case it has been found necessary to use either one four-way control valve or two three-way control valves which must be connected to the pilot valve of the four-way switch valve with two connecting pipes. Since there is at present no reliable four-way pneumatic valve on the market which is available at a reasonable price, it is the custom to use two of the more reliable three-way control valves.

By improving the construction of the switch, I have found that it may be controlled from a remote location with but one three-way control valve which needs only one connecting pipe.

The invention will be more readily understood by reference to the drawing which shows a vertical sectional view, partly in elevation, of a device according to the invention.

A four-way switch valve 10 has a valve body 11, which is preferably made as a one-piece casting having a number of valve seats and parts hereinafter described. A pressure fluid inlet conduit 15 and a waste conduit 16 may be used to connect valve 10 to a pressure fluid header and a drain, respectively, not shown, or may be used to connect several valves 10 in a face-to-face abutting relation with one end unit connected to a pressure fluid header and the other end unit to a drain, so that pressure fluid flows into several valves 10 through conduit 15 and waste fluid flows from the valves through conduit 16. A partition 20 divides the casting of the valve body 11 into two chambers 21 and 22 extending lengthwise of the valve body at opposite sides of said partition. Opposed ports 25 and 26 lead from the pressure inlet conduit 15 into chambers 21 and 22, respectively, and opposed ports 27 and 28 connect the two chambers with waste conduit 16. Valve diaphragms 30, 31, 32 and 33 are supported adjacent the ports 25, 26, 27, and 28, respectively. The diaphragms are preferably formed of rubber or other suitable flexible material and may be made as integral pairs for ports 25 and 27, and ports 26 and 28, respectively. The edge of each diaphragm is supported around its periphery in fluid-tight condition by a cap 34 held in place by screws, as shown. The caps 34 have recessed interior portions 35 forming air pressure chambers 36, 37, 38, and 39 between the outer face 40 of each diaphragm and its respective cap 34.

A conduit 45, shown broken for clarity, connects air chamber 36 with air chamber 39 thereby equalizing any pressure that may exist on the outer faces 40 of diaphragms 30 and 33. Similarly, a conduit 46 connects air chamber 37 with air chamber 38.

A pilot valve 50 is mounted on body 11 with machine screws, as shown. The pilot valve 50 is provided with a body portion 51 having a recess forming a chamber 52, a second recess forming a chamber 53, and two pressed-in valve seats 54 and 55. The chamber 53 is provided with a port 56 connecting it to atmosphere. The body portion 51 is closed by a cap 57 having a recess forming a chamber 58 and provided with a port 59. A diaphragm 60 forms an air-tight seal between chambers 58 and 52, and supports a valve stem 61 which carries valve 62 arranged to seat on valve seat 54 and a valve 63 arranged to seat on valve seat 55. The stem 61 is slidable within the valve seat structure, leaving an annular space 64. A passageway 70 connects the annular space 64 with air chamber 37 and a passageway 71 connects chamber 58 with air chamber 36.

A three-way valve 75 is positionable to be connected to a source of air under pressure $P_1$ through a pipe 76 and to atmosphere through a pipe 77. The three-way valve 75 is connected to port 59 by a pipe 78. Thus, depending on the position of valve 75 the chamber 58 is connected to air under pressure $P_1$ or vented to atmosphere. The valve 75 may be positioned manually or automatically by any suitable means, such as a solenoid 79. The main valve body 11 is provided with a port 80 which is connected to chamber 52 through a passageway 81. A passageway 82 communicates with port 80 through a pipe 83 with an air pressure header 84 which is connected to a suitable source of air pressure $P_2$. When it is desired to use a series of valves 10 as hereinbefore described the header 84 can be provided with additional branch lines, not shown, for connection to such valves.

The valve body 11 is provided with ports 90 and 91 for connection to opposite sides of a hydraulic cylinder 92 through lines 93 and 94, respectively. Port 90 communicates with pressure inlet conduit 15 and waste conduit 16 through chamber 21 and ports 25 and 27, respectively. Port 21 communicates with conduits 15 and 16 through chamber 22 and ports 26 and 28, respectively. The piston rod 95 of hydraulic cylinder 92 may be connected to any suitable device, such as a gate valve 96, which it is desired to operate reciprocably.

Operation of the device is dependent upon having the pressure $P_1$ exceed pressure $P_2$ which in turn should exceed the pressure of the fluid being supplied through inlet conduit 15.

When three-way valve 75 is in the position shown in the drawing, chamber 58 is under atmospheric pressure through port 59, pipe 78, three-way valve 75 and pipe 77. Chamber 52 is subjected to air pressure $P_2$ through pipe 83, port 80 and passageway 81. Since pressure $P_2$ is greater than atmospheric pressure, diaphragm 60 is flexed upwardly lifting valve 62 from its seat 54, and seating valve 63 on its seat 55. Pressure $P_2$ is then admitted from chamber 52 to air pressure chamber 37 through annular space 64, and passageway 70, and through conduit 46 to air pressure chamber 38. Since the pressure $P_2$ on the outside face of diaphragms 31 and 32 is greater than the fluid pressure on their inner faces, the diaphragms firmly close their respective ports 26 and 27.

Simultaneously, air pressure chamber 36 is vented to atmosphere through passageway 71, port 59, pipe 78, three-way valve 75 and pipe 77. Since the fluid pressure on the inner face of diaphragm 30 exceeds the atmospheric pressure on the outer face 40, diaphragm 30 is flexed away from port 25 permitting pressure fluid to flow from inlet conduit 15 through port 25, chamber 21, port 90, and line 93 to one side of cylinder 92. The fluid pressure moves the piston of cylinder 92 to position the gate valve 96 in a closing direction. The fluid from the opposite side of the piston is exhausted through line 94 and port 91 into chamber 22. Since the chamber 39 is connected through conduit 45 to chamber 36, atmospheric pressure prevails also in chamber 39; therefore, the pressure of the waste fluid in chamber 22 forces diaphragm 33 away from port 28, permitting the waste fluid to flow through port 28 and out waste conduit 16 to a drain, not shown.

If it is desired to open the gate valve 96, the three-way valve 75 is positioned to connect pipe 78 to pressure supply pipe 76. Pressure $P_1$ then prevails in chamber 58 forcing diaphragm 60 in the direction of chamber 52 until valve 62 seats on valve seat 54 thereby cutting off air pressure chamber 37 from pressure $P_2$ prevailing in chamber 52. The movement of diaphragm 60 also acts to unseat valve 63 permitting air pressure chamber 37 and its connected air pressure chamber 38 to be vented through passageway 70, the annular space 64, chamber 53 and port 56.

The air pressure $P_1$ prevailing in chamber 58 will be transmitted to air pressure chambers 36 and 39 whereby diaphragms 30 and 33 will close ports 25 and 28.

Under these circumstances the pressure fluid acting on the inner face of diaphragm 31 through port 26 will overcome the atmospheric pressure on the outer face of the diaphragm permitting pressure fluid to flow from inlet conduit 15 through port 26, chamber 22, port 91 and line 94 into the opposite end of the cylinder 92.

The pressure fluid will move the piston of the cylinder 92 in valve opening direction. Simultaneously liquid will be exhausted from the other side of the piston and will flow through line 93, port 90 into chamber 21, and, forcing diaphragm 32 away from port 27, through port 27 into waste conduit 16 and thence, to a drain, not shown.

It will be seen that the invention provides a simplified control for a multiple port switch device of the flexible diaphragm type which is more economical than the devices of this general type in present day use.

It will be obvious that various modifications of the embodiment of the invention shown and described for purposes of illustration can be made without departing from the spirit and scope of the invention. It should, therefore, be understood that I do not wish to limit myself to the exact structural details of the device shown herein for purposes of illustration.

While the invention has been described for purposes of illustration as employing air pressure to control the operation of the diaphragms, the device will function with other suitable gases; therefore, the term "air pressure" as used herein denotes "gas pressure" broadly.

I claim:

1. A pneumatically operated four-way switch valve for controlling flow of pressure fluid to and waste fluid from a fluid cylinder of the type wherein a piston is operated by fluid under pressure, said switch valve including a body, a pair of pressure ports and a pair of waste ports in said body, a chamber connecting a first of said pressure ports and a first of said waste ports to a fluid cylinder on one side of its piston, a second chamber connecting a second of said pressure ports and a second of said waste ports to said fluid cylinder on the other side of its piston, a pressure port valve for each pressure port, a waste port valve for each waste port, a recessed cap over each pressure and each waste port valve and forming first and second pressure port chambers and first and second waste port chambers with the respective valves, and passageways between said first pressure port chamber and said second waste port chamber and between said second pressure port chamber and said first waste port chamber, respectively, characterized in that each of said pressure port valves comprises a single diaphragm having equal effective areas on both faces, and by control means including a control diaphragm, means for selectively applying to one side of said control diaphragm a first gas pressure in excess of the pressure in said pressure ports and atmospheric pressure, means for continually applying to the other side of said control diaphragm a second gas pressure which is higher than the pressure in said pressure ports but lower than said first gas pressure, means for transmitting the pressure applied to said one side of said control diaphragm to said first pressure port chamber, and means operable to transmit to said second pressure port chamber said second gas pressure when atmospheric pressure is applied to the said one side of said control diaphragm and atmospheric pressure when said first gas pressure is applied to the said one side of said control diaphragm.

2. A pilot valve for a pneumatically controlled four-way switch valve of the type controlling flow of pressure fluid to and waste fluid from opposite sides of a reciprocable piston and including first and second pressure ports and first and second waste ports, said first pressure port and said first waste port being connected to one side of said piston, said second pressure port and said second waste port being connected to the other side of said piston, a pressure port valve for each pressure port, a waste port valve for each waste port, and means for transmitting to the first waste port valve the pressure applied to the second pressure port valve in valve closing direction and to the second waste port valve the pressure applied to the first pressure port valve in valve closing direction, said pilot valve comprising a diaphragm, means operable to selectively apply to one side of said diaphragm atmospheric pressure and a first air pressure in excess of the pressure in said pressure ports, means for applying to the other side of said diaphragm a second air pressure of a magnitude intermediate said first air pressure and the pressure in said pressure ports, a first passageway transmitting the pressure applied to said one side of said diaphragm to said first pressure port valve in valve closing direction, a second passageway adapted to transmit the pressure applied to said other side of said diaphragm or atmospheric pressure to said second pressure port valve in valve closing direction, and valve means operatively connected with said second passageway and positioned by movement of said diaphragm in response to the difference in pressures applied thereto to admit said second air pressure to said second pressure port valve in valve closing direction when atmospheric pressure is applied to said one side of said diaphragm and to admit atmospheric pressure to said second pressure port valve in valve closing direction when said first air pressure is applied to said one side of said diaphragm.

3. The device of claim 2 characterized in that the means operable to selectively apply to one side of said diaphragm atmospheric pressure and said first air pressure comprises wall means forming with said one side of said diaphragm an air pressure chamber, a port in said wall means, and a three-way valve positionable to connect said port to atmosphere and to the source of said first air pressure.

4. The device of claim 2 characterized in that the means for applying to the other side of said diaphragm said second air pressure comprises wall means forming with said other side of said diaphragm an air pressure chamber, a port in said wall means, and a conduit connecting said port to the source of said second air pressure.

5. In a four-way switch valve for controlling flow of pressure fluid to and waste fluid from a fluid cylinder of the type wherein a piston is operated by fluid under pressure, said switch valve including first and second pressure ports and first and second waste ports, a pressure port diaphragm over each pressure port, a waste port diaphragm over each waste port, a recessed cap over each pressure and each waste port diaphragm and forming first and second pressure port chambers and first and second waste port chambers with the respective diaphragms, conduit means connecting said first waste port chamber to said second pressure port chamber, and conduit means connecting said second waste port chamber to said first pressure port chamber, improved means for controlling opening and closing of said ports by said diaphragms comprising a pilot valve body, first, second, and third air pressure chambers in said body, a port in said first air pressure chamber, a port and a valve in said second air pressure chamber, a vent and a valve in said third air pressure chamber, means to selectively connect the port in said first air pressure chamber to atmosphere and to a first source of air under pressure which exceeds the fluid pressure in said pressure ports, means to continually connect said port in said second air pressure chamber to a source of air pressure of a magnitude intermediate the pressure from said first source and the fluid pressure in said pressure ports, a passageway connecting said first air pressure chamber to said first pressure port chamber, passageway means connecting said second pressure port chamber to said second and third air pressure chambers, a control diaphragm interposed between said first and second air pressure chambers, said valves being rigidly connected and positionable by movement of said control diaphragm in one direction in response to a pressure difference in said first and second air pressure chambers to connect said second pressure port chamber to said second air pressure chamber, and by movement of said control diaphragm in the other direction to connect said second pressure port chamber to said third air pressure chamber.

References Cited in the file of this patent
UNITED STATES PATENTS

| | | |
|---|---|---|
| 2,179,559 | Meyer | Nov. 14, 1939 |
| 2,376,918 | Hughes | May 29, 1945 |